(12) United States Patent
Imafuku et al.

(10) Patent No.: US 7,529,023 B2
(45) Date of Patent: May 5, 2009

(54) IMAGE DISPLAY, FRESNEL LENS AND SCREEN

(75) Inventors: Daisuke Imafuku, Fujisawa (JP); Hiroki Yoshikawa, Hiratsuka (JP); Tetsu Ohishi, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 258 days.

(21) Appl. No.: 11/513,523

(22) Filed: Aug. 30, 2006

(65) Prior Publication Data
US 2007/0146877 A1    Jun. 28, 2007

(30) Foreign Application Priority Data
Dec. 22, 2005   (JP)   ............... 2005-369022

(51) Int. Cl.
G03B 21/60    (2006.01)
G03B 21/56    (2006.01)
G02B 3/08     (2006.01)

(52) U.S. Cl. .................. 359/457; 359/460; 359/742

(58) Field of Classification Search .......... 359/457, 359/742–743, 452–453, 460
See application file for complete search history.

(56) References Cited
U.S. PATENT DOCUMENTS
4,871,233 A * 10/1989 Sheiman .................. 359/464
5,661,600 A * 8/1997 Mitani et al. ............. 359/457
6,292,295 B1 * 9/2001 Yamashita et al. ........ 359/460
6,926,412 B2 * 8/2005 Kim et al. ................. 353/94
6,989,929 B2 * 1/2006 Watanabe ................. 359/457

FOREIGN PATENT DOCUMENTS
JP     05-333437      12/1993
JP     2002-341452    11/2002

* cited by examiner

*Primary Examiner*—Christopher Mahoney
(74) *Attorney, Agent, or Firm*—Townsend and Townsend and Crew LLP

(57) ABSTRACT

In a Fresnel screen for displaying an image, comprising, a screen surface, and a reverse surface opposite to the screen surface in a thickness direction of the screen to be prevented from facing to the viewer, the Fresnel screen has first prism surfaces extending to have respective longitudinal arc-shapes juxtaposed with each other as seen in the thickness direction to deflect light beams for forming the image in at least one of directions perpendicular to each other as seen in the thickness direction, and second prism surfaces extending to have respective longitudinal shapes juxtaposed with each other as seen in the thickness direction to deflect at least a part of the light beams in at least one of the directions perpendicular to each other as seen in the thickness direction.

14 Claims, 13 Drawing Sheets

12
IMAGE DISPLAY, FRESNEL LENS AND SCREEN

INCORPORATION BY REFERENCE

The present application claims priority from Japanese application JP2005-369022 filed on Dec. 22, 2005, the content of which is hereby incorporated by reference into this application.

BACKGROUND OF THE INVENTION

The present invention relates to an image display apparatus for projecting an image from an image forming source obliquely onto a surface of a screen of rear projection type through an oblique projecting optical system, a Fresnel lens sheet usable in the image display apparatus and the screen of rear projection type usable in the image display apparatus.

In an image display apparatus disclosed by JP-A-2002-341452, an image is projected onto a screen obliquely to a normal line of a screen surface through a curved reflection mirror surface for compensating a deformation of the image caused by the oblique projection.

In a rear projection television disclosed by JP-A-5-333437, a circular Fresnel lens and a linear Fresnel lens are juxtaposed with each other in such a manner that prism surface of the circular Fresnel lens and prism surface of the linear Fresnel lens face to a lenticular sheet in the same direction or the prism surface of the circular Fresnel lens and the prism surface of the linear Fresnel lens face to each other through a gaseous matter.

BRIEF SUMMARY OF THE INVENTION

An object of the present invention is to provide a projection type image display apparatus and a Fresnel screen usable in the projection type image display apparatus, in which an angle between a normal line of a screen surface and each of light beams corresponding to respective pixels forming an image and proceeding out of the whole of the screen surface is decreased effectively by refracting the light beams proceeding into the screen obliquely to the normal line.

According to the invention, in a projection type image display apparatus for displaying an image for a viewer, having, an image forming element for forming an original image, a Fresnel screen including a screen surface to be set to face to the viewer so that the image to be seen by the viewer is displayed on the screen surface, and a reverse surface opposite to the screen surface in a thickness direction of the screen to be prevented from facing to the viewer, and a projector for magnifying the original image and projecting the image as the magnified original image through the reverse surface onto the screen surface, or in a Fresnel screen for displaying an image formed by a projector for a viewer, comprising, a screen surface to be set to face to the viewer so that the image to be seen by the viewer is displayed on the screen surface, and a reverse surface opposite to the screen surface in a thickness direction of the screen to be prevented from facing to the viewer, so that the image is projected through the reverse surface onto the screen surface, the Fresnel screen has first prism surfaces extending to have respective longitudinal arc-shapes juxtaposed with each other as seen in the thickness direction to deflect light beams for forming the image in at least one of directions perpendicular to each other as seen in the thickness direction, and second prism surfaces extending to have respective longitudinal shapes juxtaposed with each other as seen in the thickness direction to deflect at least a part of the light beams in at least one of the directions (equal to or different from the above at least one of directions) perpendicular to each other as seen in the thickness direction. Refracting directions of the first prism surfaces and the second prism surfaces are opposed to at least components of directions of projecting directions of the light beams proceeding into the screen obliquely to the screen surface so that an angle between a normal line of the screen surface and each of the light beams corresponding to respective pixels forming an image and proceeding out of the whole of the screen surface is decreased effectively.

If the first prism surfaces are included by one of the screen surface and the reverse surface, and the second prism surfaces are included by the other one of the screen surface and the reverse surface, the first prism surfaces and the second prism surfaces can be integrated on the screen so that a positional relationship between the first prism surfaces and the second prism surfaces can be set correctly.

If the screen is prevented from including a gaseous matter arranged between the first prism surfaces and the second prism surfaces in the thickness direction so that the at least a part of light beams is prevented from proceeding through the gaseous matter between the first prism surfaces and the second prism surfaces, a total number of boundaries between the screen including the first prism surfaces and the second prism surfaces and the gaseous matter along an optical path of each of the light beams through the screen is kept minimum so that an optical design for each of the light beams is simplified.

If at least one of a set of the first prism surfaces and a set of the second prism surfaces is operative to deflect at least two portions of the at least a part of light beams to be prevented from crossing each other as seen in another direction perpendicular to the thickness direction, the at least a part of light beams is dispersed effectively to increase a region in which the image of sufficient brightness can be viewed by the viewer.

If the second prism surfaces are prevented from overlapping a part of the first prism surfaces as seen in the thickness direction so that a refractive power for a part of the light beams on a region of the screen in which the second prism surfaces are prevented from overlapping the part of the first prism surfaces as seen in the thickness direction to pass the part of light beams through the part of the first prism surface while preventing the part of light beams from passing through the second prism surfaces is smaller than a refractive power for another part of the light beams on another region of the screen in which the second prism surfaces overlap another part of the first prism surfaces as seen in the thickness direction to pass the another part of light beams through the another part of the first prism surface and the second prism surfaces, refractive powers for the respective light beams corresponding to the respective pixels over the whole of the screen surface can be set precisely at respective desired degrees.

If normal lines of one of the longitudinal arc-shapes of the first prism surfaces at positions distant from each other along the one of the longitudinal arc-shapes cross each other at a crossing point as seen in the thickness direction, and a distance between the crossing point and the region in a refracting direction of a refractive power of the second prism surfaces is greater than a distance between the crossing point and the another region in the refracting direction of the refractive power of the second prism surfaces as seen in the thickness direction, and/or a distance between the crossing point and the region in a direction perpendicular to a refracting direction of a refractive power of the second prism surfaces is smaller than a distance between the crossing point and the another region in the direction perpendicular to the refracting direction of the refractive power of the second prism surfaces as seen in the thickness direction, and/or the crossing point is prevented from overlapping the screen surface as seen in the thickness direction, and/or a refractive power for a part of the light beams by the second prism surfaces on a region of the screen relatively radially outer from the crossing point in a direction parallel to a refracting direction of the refractive power is smaller than another refractive power for another part of the light beams by the second prism surfaces on another region of the screen relatively radially inner from the crossing point in the direction parallel to the refracting direction of the refractive power, and/or a refractive power for a part of the light beams by the second prism surfaces on a region of the screen relatively radially outer from the crossing point in a direction perpendicular to a refracting direction of the refractive power is greater than another refractive power for another part of the light beams by the second prism surfaces on another region of the screen relatively radially inner from the crossing point in the direction perpendicular to the refracting direction of the refractive power, an optical or refractive characteristic or performance of the longitudinal arc-shapes of the first prism surfaces is compensated by the second prism surfaces effectively for decreasing an angle between a normal line of the screen surface and each of the light beams corresponding to the respective pixels forming the image and proceeding out of the whole of the screen surface.

It is preferable for effectively receiving the at least a part of the obliquely projected light beams with a minimum area of the region that the that the second prism surfaces project outward with respect to the region in the thickness direction.

If normal lines of the longitudinal arc-shape of each of the first prism surfaces at positions distant from each other along the respective one of the longitudinal arc-shapes cross each other at a respective crossing point as seen in the thickness direction, and the crossing points are prevented from overlapping the screen surface as seen in the thickness direction, the first prism surfaces can refract the light beams in both of the directions perpendicular to each other over the whole of the screen surface as seen in the thickness direction.

Other objects, features and advantages of the invention will become apparent from the following description of the embodiments of the invention taken in conjunction with the accompanying drawings.

DETAILED DESCRIPTION OF THE INVENTION

Figure 1:
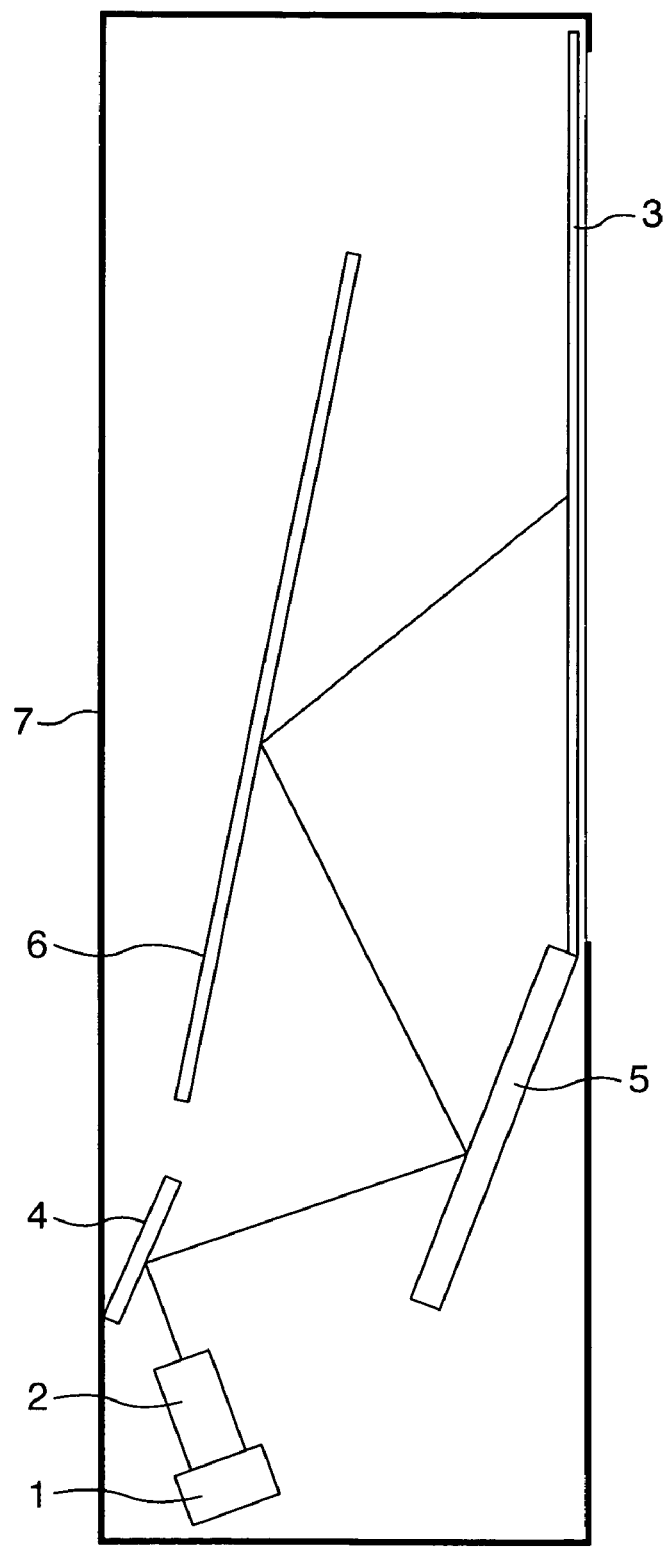
FIG. 1 is a cross sectional view showing an embodiment of a projection type image display apparatus of the invention.

In FIG. 1, an image forming source 1 may include, for example, a projection type Braun tube. Alternatively, it may include an image modulation element such as a reflection type/transmission type liquid crystal panel or a display element including a plurality of micro-mirrors or the like. When such image modulation element is used, the image forming source further includes a light source such as a mercury lamp or the like for irradiating the image modulation element with light, and the image modulation element modulates the light supplied from the light source at each pixel in accordance with an input image signal so that the image is formed. Whereby, the image of small size is formed on a display surface of the image forming source 1. As shown in FIG. 1, a projection optical system for magnifying the image from the small size and projecting the magnified image onto a rear projection type screen 3 has a projection lens 2 as an image magnifying part for magnifying the image from the small size and projecting the magnified image onto the rear projection type screen 3, a first curved surface reflection mirror 4 for reflecting a light beam outgoing from the projection lens 2 to form the image, a second curved surface reflection mirror 5 for reflecting the light beam outgoing from the first curved surface reflection mirror 4 to form the image, and a reflection mirror 6 of, for example, planer shape, for reflecting the light beam outgoing from the second curved surface reflection mirror 5 to form the image, so that a depth of the image display apparatus is decreased. The projection lens 2, the first curved surface reflection mirror 4, the second curved surface reflection mirror 5 and the reflection mirror 6 of planer shape are arranged on an optical path from the image forming source 1 to the rear projection type screen 3, and are contained in a chassis 7 of the image display apparatus to be fixed to predetermined positions.

In the image display apparatus, the light outgoing from the projection lens 2 to form the image is obliquely projected onto the rear projection type screen 3. Therefore, a light beam at a center of the image (a light beam emitted from a central position of the image modulation element) is projected vertically upward with a predetermined angle with respect to a normal line of a main planer surface of the rear projection type screen 3. The light beam projected obliquely to form the image generates a trapezoidal deformation and aberration on the rear projection type screen 3. Therefore, those are corrected by the first curved surface reflection mirror 4 and the second curved surface reflection mirror 5.

Figure 2:
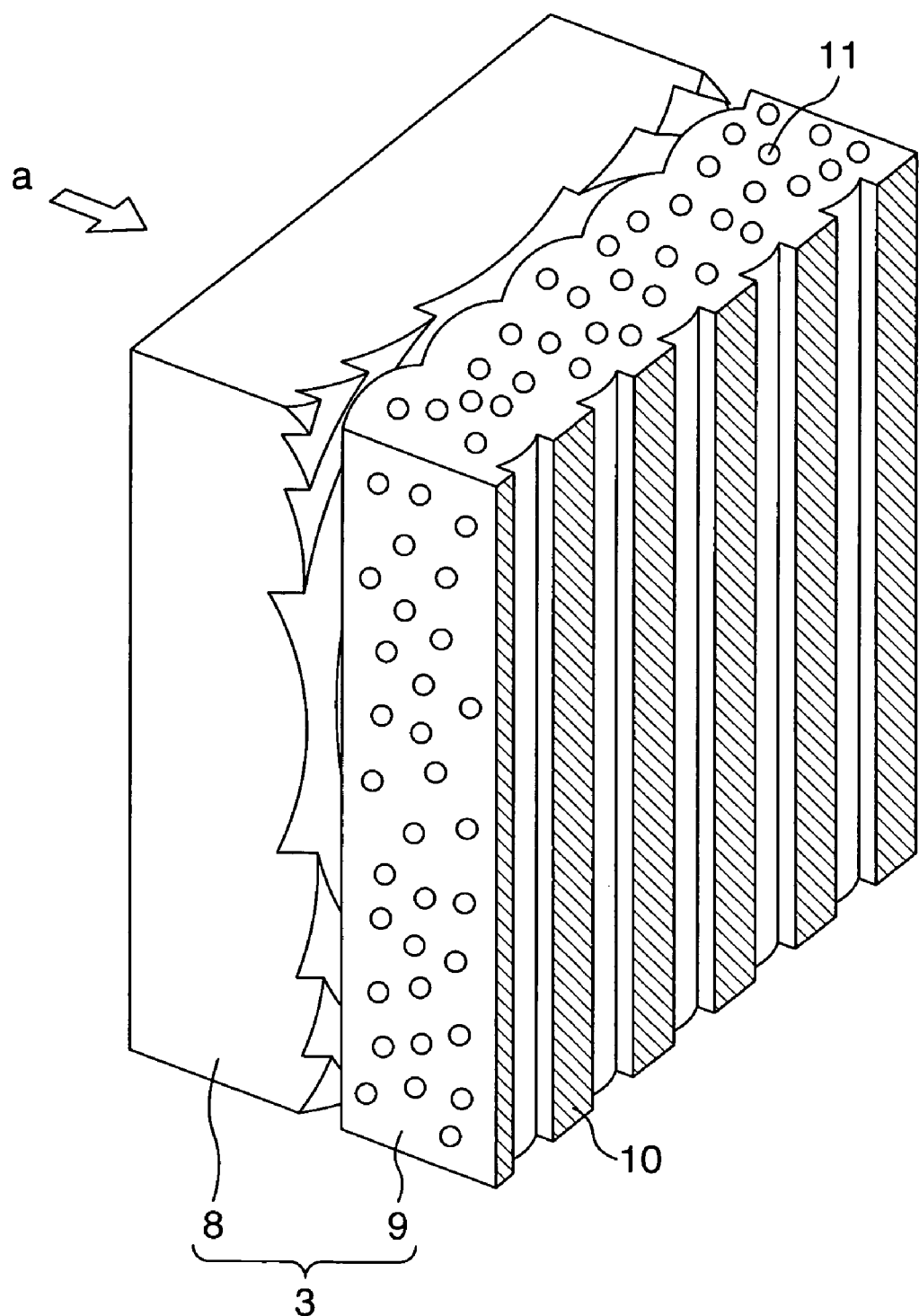
FIG. 2 is an oblique projection view showing a screen of rear projection type usable for the embodiment of the projection type image display apparatus of the invention.

As shown in FIG. 2, the rear projection type screen 3 has an aspherical Fresnel lens sheet (hereafter, calles as an Fresnel lens sheet) 8 including a Fresnel lens of refraction type having prism surfaces of Fresnel angles corresponding to an aspherical original surface, and a lenticular lens sheet 9 as a dispersion sheet. As shown in FIG. 2, the Fresnel lens have the prism surfaces as concentric circles on a light emitting surface of the Fresnel lens sheet 8.

The Fresnel angle is an angle between the main planer surface of the Fresnel lens sheet and the prism surface. In the rear projection type screen 3, the light projected in a direction shown by an arrow mark a in FIG. 2 to project the magnified image is converted to a light substantially parallel to the normal line of the main planer surface of the rear projection type screen 3 by the Fresnel lens sheet 8, that is, the aspherical prism of the Fresnel lens. Alternatively, the light for projecting the magnified image is converted to a light deflected radially inward, that is, toward the center of the rear projection type screen 3. In other words, an outgoing angle of the light emitted from the Fresnel lens sheet 8, that is, an angle thereof with respect to the normal line of the rear projection type screen 3 becomes substantially zero. Subsequently, the light emitted from the Fresnel lens sheet 8 proceeds into the lenticular lens sheet 9. The lenticular lens sheet 9 includes a plurality of lenticular lenses longitudinally extending in a vertical direction of the screen and juxtaposed with each other in a horizontal direction of the screen, so that the light emitted from the Fresnel lens sheet 8 is dispersed in the horizontal direction of the screen. Further, black stripes 10 extending in the vertical direction of the screen are arranged at a boundary of the lenticular lens opposed to the emitting area of the lenticular lens sheet 9 so that a light proceeding into the emitting area of the screen is absorbed. Further, the lenticular lens sheet 9 includes a transparent resin and dispersing members 11 distributed in the resin so that the dispersing members disperse the light forming the image in the horizontal and vertical directions of the screen.

In the above embodiment, the lenticular lens sheet 9 including the dispersing members 11 for dispersion in the horizontal and vertical directions of the screen is used. Alternatively, a dispersion sheet including a total reflection surface for dispersing in the horizontal direction the light supplied from the Fresnel lens sheet 8 may be used. Further, another dispersion sheet of beads type including closely distributed micro beads may be used. As a matter of course, another light dispersing member may be used.

Incidentally, a planer front sheet may be arranged at a light outgoing side of the lenticular lens sheet 9. Further, the front sheet and the lenticular lens sheet 9 may be joined to each other through an adhesive. Further, the dispersing members 11 may be included by the front sheet rather than the lenticular lens sheet 9. Further, an anti-reflection layer or hard-coat may be arranged at a light outgoing side of the front sheet 9. A second lenticular lens is arranged to be opposed to the light outgoing side of the lenticular lens sheet 9, that is, a focal spot of the lenticular lens as shown in FIG. 2, however, this focal spot may be planer when the image modulating element is used for the image forming source 1. It is preferable for an air to be prevented from existing between the lenticular lens sheet 9 and the front sheet joined to each other.

Figure 3:
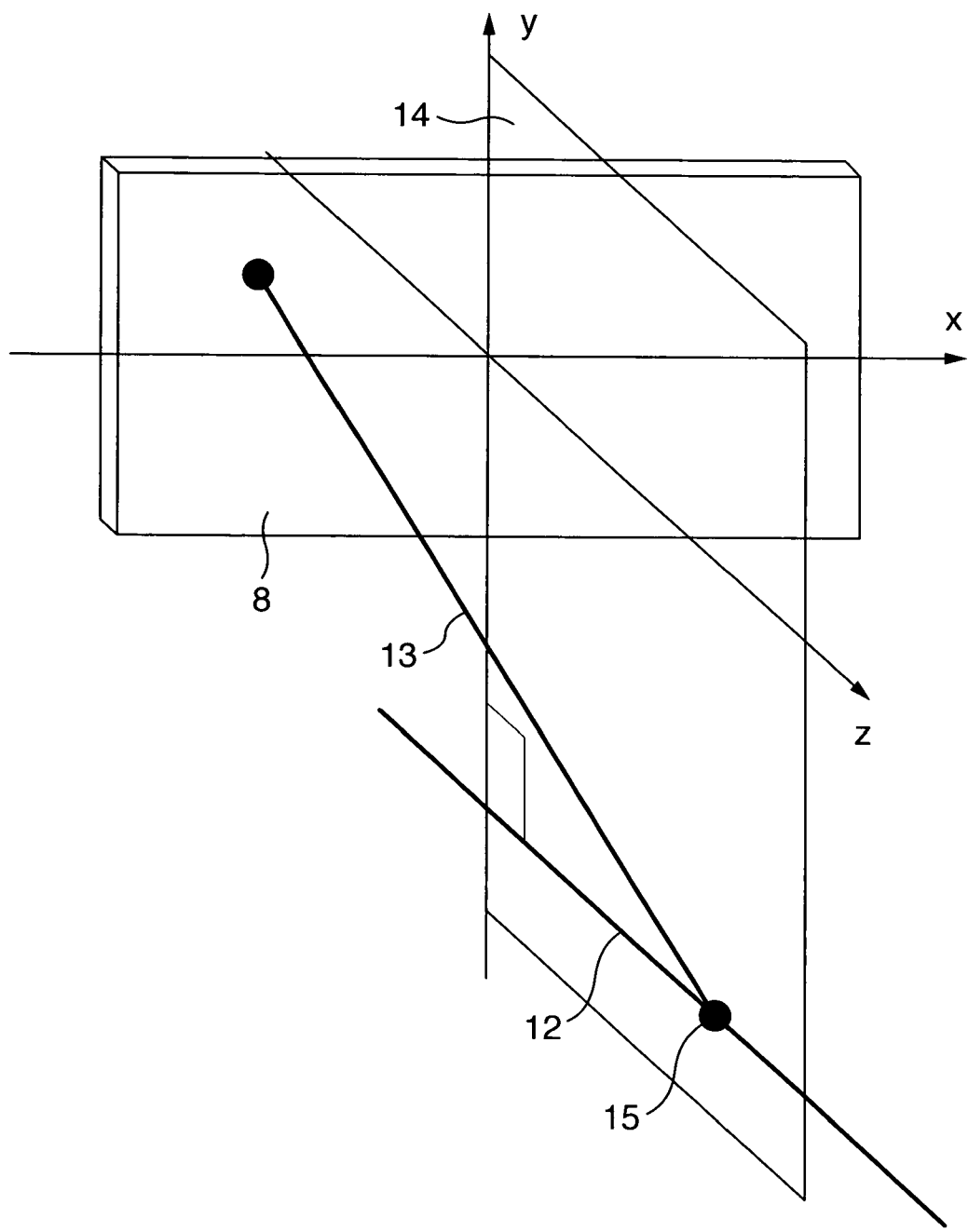
FIG. 3 is a view for explaining how to design an original lens surface before converting the original lens surface to prism surfaces of a Fresnel lens.

With making reference to FIG. 3, how to design a shape of the original lens surface of the concentric prism surfaces of the Fresnel lens on the Fresnel lens sheet 8 is explained. The prism surfaces of the Fresnel lens on the Fresnel lens sheet 8 are concentrically arranged around a point (rotational axis). The original surface for determining a Fresnel angle of each of the prism surfaces of the Fresnel lens, that is, an angle between each of the prism surfaces and a main planer plane of the Fresnel lens sheet 8, is aspherical. The original surface is the basis of the Fresnel angle of each of the prism surfaces, and corresponds to a lens surface before being converted to the prism surfaces of the Fresnel lens 8. That is, when the Fresnel angle of each of the prism surfaces of the Fresnel lens is determined, a lens characteristic of an imaginary lens corresponding to the Fresnel lens is determined so that the shape of the surface of the imaginary lens is the original surface. Subsequently, shapes of areas of the original surface (for example, tangential shapes of the areas) are transferred onto corresponding areas of the surface of the Fresnel lens sheet 8, so that the Fresnel angle of the prism surface of each of the areas of the surface of the Fresnel lens sheet 8 is determined. Therefore, an imaginary curved face as the combined prism surfaces over the Fresnel lens sheet along the Fresnel angles, that is, a generic face including the prism surfaces over the Fresnel lens sheet, is the original surface. Therefore, a refractive direction of light on each of the prism surfaces of the Fresnel lens sheet is determined in accordance with the shape of the corresponding area of the original surface. Incidentally, the rotational axis (on a planer face including z axis) is perpendicular to the main planer surface (x-y face) of the Fresnel lens sheet 8. Further, the rotational axis includes a pint 15 at which a light beam 13 proceeding into the Fresnel lens sheet 8 and a plane 14 (parallel to y-z plane) dividing vertically the Fresnel lens sheet 8 into identical left and right portions intersect each other. That is, the rotational axis is an axis 12 perpendicular to the main planer surface of the Fresnel lens sheet 8 as shown in FIG. 3.

Incidentally, since an incidence angle (with respect to a normal line on an incidence surface) of the light beam 13 varies in accordance with a position on the screen at which the light beam 13 proceeding into the screen, a plurality of the axes 12 exist. A central one of the axes 12 is used as the rotational axis of the Fresnel lens (a central position of the concentric circular prism surfaces of the Fresnel lens).

The Fresnel shape (angle) of each of the prism surfaces is determined as follows. At first, an angle of each of the prism surfaces for emitting the light beam along the normal line (outgoing angle 0) with refracting the light beam taken into the screen through the each of the prism surfaces of the Fresnel lens sheet 8 is determined along theorem of Snell. Subsequently, the prism surfaces of the determined angles are combined to form the original (aspherical) surface for the Fresnel lens. Incidentally, the original surface is approximated along aspherical formula. By comparing aspherical coefficients and actual light outgoing angles with each other, a position of the rotational axis and the aspherical coefficients are modified to make the light outgoing angles substantially zero.

The Fresnel lens sheet 8 is formed on the basis of the position of the rotational axis as a rotational center of the concentric circular prism surfaces of the Fresnel lens and the aspherical coefficients of the original surface as the combination of the prism surfaces so that the light beam taken into the screen to form the image through curved reflection mirrors (first curved reflection mirror 4 and second curved reflection mirror 5) on the optical path of the light beam in the projection optical system of the image display apparatus has the outgoing angle of substantially zero. Therefore, by the Fresnel lens sheet as the embodiment, a brightness of the image can be substantially constant over the whole of the screen.

Examples of numerical values of optical elements for applying the above described Fresnel lens sheet 8 to an image display apparatus including a screen of diagonal size 50 inches (aspect ratio 9:16) are shown below. Incidentally, the below table 1 indicates an arrangement of the optical elements starting from the projection lens 2 in angle and distance in x, y, z coordinates. An angle of the projection lens is an outgoing angle therefrom, and angles of the curved reflection mirrors, reflection mirror and screen are incidence angles thereof.

A central position of the screen is an origin of the coordinates ((x, y, z)-(0, 0, 0)). Incidentally, left-right direction (horizontal direction) of the screen is the x coordinate, and a rightward direction is +(positive). Further, upward-downward direction (vertical direction) of the screen is the y coordinate, and an upward direction is +(positive). Further, a depth direction is the z coordinate, and a backward direction toward a rear side of the image display apparatus is – (negative). Further, the angle is formed with respect to the x coordinate in x-z cross section. The distance is defined between the optical elements along the optical path of the light beam from a central point of the image modulation element of the image forming source 1 to the center of the screen. A unit for the x, y, z coordinates and the distance is mm.

TABLE 1

| optical element | X | y | z | angle (°) | distance |
|---|---|---|---|---|---|
| projection lens | 0 | −761.45 | −282.32 | 0 | 150 |
| first curved reflection mirror 4 | 0 | −623.37 | −340.93 | 45 | 239.1 |
| second curved reflection mirror 5 | 0 | −529.95 | −120.84 | 45 | 312 |
| planar reflection mirror 6 | 0 | −240.75 | −240.75 | 56 | 343.3 |
| screen 3 | 0 | 0 | 0 | 45 | 0 |

$$w = \Sigma c_j \cdot u^m \cdot v^n \quad \text{Formula 1}$$

TABLE 2

$C_j$ of first curved reflection mirror

| | | | |
|---|---|---|---|
| $u^2$ | −3.2627956 * 10$^{-4}$ | $v^7$ | −4.2384259 * 10$^{-16}$ |
| $v^2$ | −2.7342603 * 10$^{-4}$ | $u^8$ | −2.44870957 * 10$^{-16}$ |
| $u^2v$ | 4.219671 * 10$^{-6}$ | $u^6v^2$ | 5.59736313 * 10$^{-16}$ |
| $v^3$ | −9.0741489 * 10$^{-7}$ | $u^4v^4$ | −3.9135962 * 10$^{-17}$ |
| $u^4$ | 3.76895394 * 10$^{-8}$ | $u^2v^6$ | −4.82512597 * 10$^{-17}$ |
| $u^2v^2$ | −6.49737092 * 10$^{-8}$ | $v^8$ | −6.7465302 * 10$^{-19}$ |
| $v^4$ | 2.20014707 * 10$^{-3}$ | $u^8v$ | 1.882894699 * 10$^{-17}$ |
| $u^4v$ | −2.9086400 * 10$^{-10}$ | $u^6v^3$ | 9.969359116 * 10$^{-13}$ |
| $u^2v^3$ | −3.4334099 * 10$^{-11}$ | $u^4v^5$ | −2.42837400 * 10$^{-18}$ |
| $v^5$ | −3.2694900 * 10$^{-12}$ | $u^2v^7$ | −2.46749206 * 10$^{-19}$ |
| $u^6$ | −2.18676160 * 10$^{-12}$ | $v^9$ | 1.86624308 * 10$^{-20}$ |
| $u^4v^2$ | 9.93709435 * 10$^{-13}$ | $u^{10}$ | −9.74821072 * 10$^{-21}$ |
| $u^2v^4$ | 1.830653575 * 10$^{-12}$ | $u^8v^2$ | −1.60666389 * 10$^{-19}$ |
| $v^6$ | −7.83618202 * 10$^{-14}$ | $u^6v^4$ | −1.82715283 * 10$^{-20}$ |
| $u^6v$ | −7.07996207 * 10$^{-14}$ | $u^4v^6$ | 1.57793776 * 10$^{-20}$ |
| $u^4v^3$ | 3.1929889 * 10$^{-14}$ | $u^2v^8$ | 2.10989801 * 10$^{-21}$ |
| $u^2v^5$ | 5.88653028 * 10$^{-17}$ | $v^{10}$ | −2.91564903 * 10$^{-23}$ |

TABLE 3

$C_j$ of second curved reflection mirror

| | | | |
|---|---|---|---|
| $u^2$ | −7.0783312 * 10$^{-4}$ | $v^7$ | −6.15789986 * 10$^{-15}$ |
| $v^2$ | 1.40773686 * 10$^{-4}$ | $u^8$ | 8.458346543 * 10$^{-13}$ |
| $u^2v$ | −3.23558379 * 10$^{-6}$ | $u^6v^2$ | −1.54520583 * 10$^{-17}$ |
| $v^3$ | −3.658032027 * 10$^{-7}$ | $u^4v^4$ | 1.02166797 * 10$^{-17}$ |
| $u^4$ | 1.384747347 * 10$^{-8}$ | $u^2v^6$ | −3.01595786 * 10$^{-17}$ |
| $u^2v^2$ | −1.248068173 * 10$^{-8}$ | $v^8$ | 3.855409065 * 10$^{-17}$ |
| $v^4$ | −4.698830800 * 10$^{-9}$ | $u^8v$ | −3.06405908 * 10$^{-20}$ |
| $u^4v$ | 5.448132025 * 10$^{-11}$ | $u^6v^3$ | 3.00052439 * 10$^{-20}$ |
| $u^2v^3$ | −5.46538633 * 10$^{-11}$ | $u^4v^5$ | −9.83809597 * 10$^{-20}$ |
| $v^5$ | 3.707619336 * 10$^{-11}$ | $u^2v^7$ | 3.316504812 * 10$^{-19}$ |
| $u^6$ | −4.17675900 * 10$^{-13}$ | $v^9$ | −8.37876233 * 10$^{-20}$ |
| $u^4v^2$ | 3.874442611 * 10$^{-13}$ | $u^{10}$ | −1.05747627 * 10$^{-22}$ |
| $u^2v^4$ | −1.91573040 * 10$^{-14}$ | $u^8v^2$ | 7.491755095 * 10$^{-23}$ |
| $v^6$ | 4.21324044 * 10$^{-14}$ | $u^6v^4$ | −2.16969819 * 10$^{-23}$ |
| $u^6v$ | −3.52688320 * 10$^{-16}$ | $u^4v^6$ | 5.684876639 * 10$^{-22}$ |
| $u^4v^3$ | 6.905122262 * 10$^{-17}$ | $u^2v^8$ | −1.02473070 * 10$^{-21}$ |
| $u^2v^5$ | 5.931535661 * 10$^{-16}$ | $v^{10}$ | 7.886171405 * 10$^{-23}$ |

In the coordinates on the formula 1, a transverse direction is along u coordinate, a vertical direction is along v coordinate, and a direction perpendicular to the surface and parallel to the z coordinate is along w coordinate. Further, in the formula 1, $c_j$ is coefficient for $u^m \cdot v^n$ to be obtained along the formula 2, and j is an integer number not less than 2.

$$j = [(m+n)^2 + m + 3n]/2 + 1 \quad \text{Formula 2}$$

As described above, the reflection surfaces of the first curved surface reflection mirror 3 and the second curved reflection surface mirror 4 are free-form surfaces. The free-form surfaces in the embodiment are symmetrical with respect to the y coordinate, however are not symmetrical with respect to the x coordinate. That is, the reflection surfaces of the first curved surface reflection mirror 3 and the second curved reflection surface mirror 4 are the free-form surfaces not-having rotational symmetries. At least one of them is curved to project with respect to the reflecting direction thereof, and a curvature of a part for reflecting the light beam proceeding into a lower end of the transmission type screen 3 is greater than a curvature of another part for reflecting the light beam proceeding into an upper end of the transmission type screen. Further, the part for reflecting the light beam proceeding into the lower end of the transmission type screen may project with respect to the reflecting direction, and the another part for reflecting the light beam proceeding into the upper end of the transmission type screen may be concaved.

The following formula 3 is a polynomial equation representing the aspherical surface for determining the shape of the original surface for the Fresnel lens sheet 8. Examples of coefficients for the polynomial equation representing the aspherical surface for determining the shape of the original surface for the Fresnel lens sheet 8 are shown in the below table 4.

$$z = (c \cdot r^2)/[1 + \{1 - (1+k) \cdot c^2 \cdot r^2\}^{1/2} + d_4 \cdot r^4 + \\ d_6 \cdot r^6 + d_8 \cdot r^8 + d_{10} \cdot r^{10} + d_{12} \cdot r^{12} + d_{14} \cdot r^{14} + \ldots \quad \text{Formula 3}$$

TABLE 4

| | |
|---|---|
| c | −2.89878 * 10$^2$ |
| k | −1.0541549 |
| $d_2$ | −0.386266 * 10$^{-4}$ |
| $d_4$ | 0.760589 * 10$^{-9}$ |

TABLE 4-continued

| | |
|---|---|
| $d_6$ | $-0.431335 * 10^{-14}$ |
| $d_8$ | $0.111331 * 10^{-19}$ |
| $d_{10}$ | $-0.148576 * 10^{-25}$ |
| $d_{12}$ | $0.100254 * 10^{-31}$ |
| $d_{14}$ | $-0.2707 * 10^{-38}$ |

In the formula 3, z is a sag value on a face parallel to the z coordinate, r is a distance from the rotational axis, c is a top curvature, k is a conic coefficient, dn (n=2, 4, 6, 8, 10, 12, 12 - - - : multiple of 2) is an aspherical coefficient in n order.

In the Fresnel lens sheet 8 of the embodiment, on the basis of a distribution of the incidence angles of the light supplied to the screen to form the image, the central axis of the Fresnel lens (refer to denoting number 12 in FIG. 2) is arranged downwardly distant from the center of the screen by 545 mm. In other words, in the embodiment, the central axis is not arranged on the surface of the Fresnel lens sheet 8, but arranged at the outside of the surface of the Fresnel lens sheet 8, that is, the outside of an area for displaying the image. The prism surfaces of the Fresnel lens extend along concentric circular arcs around the central axis at the outside of the screen.

Figure 6:
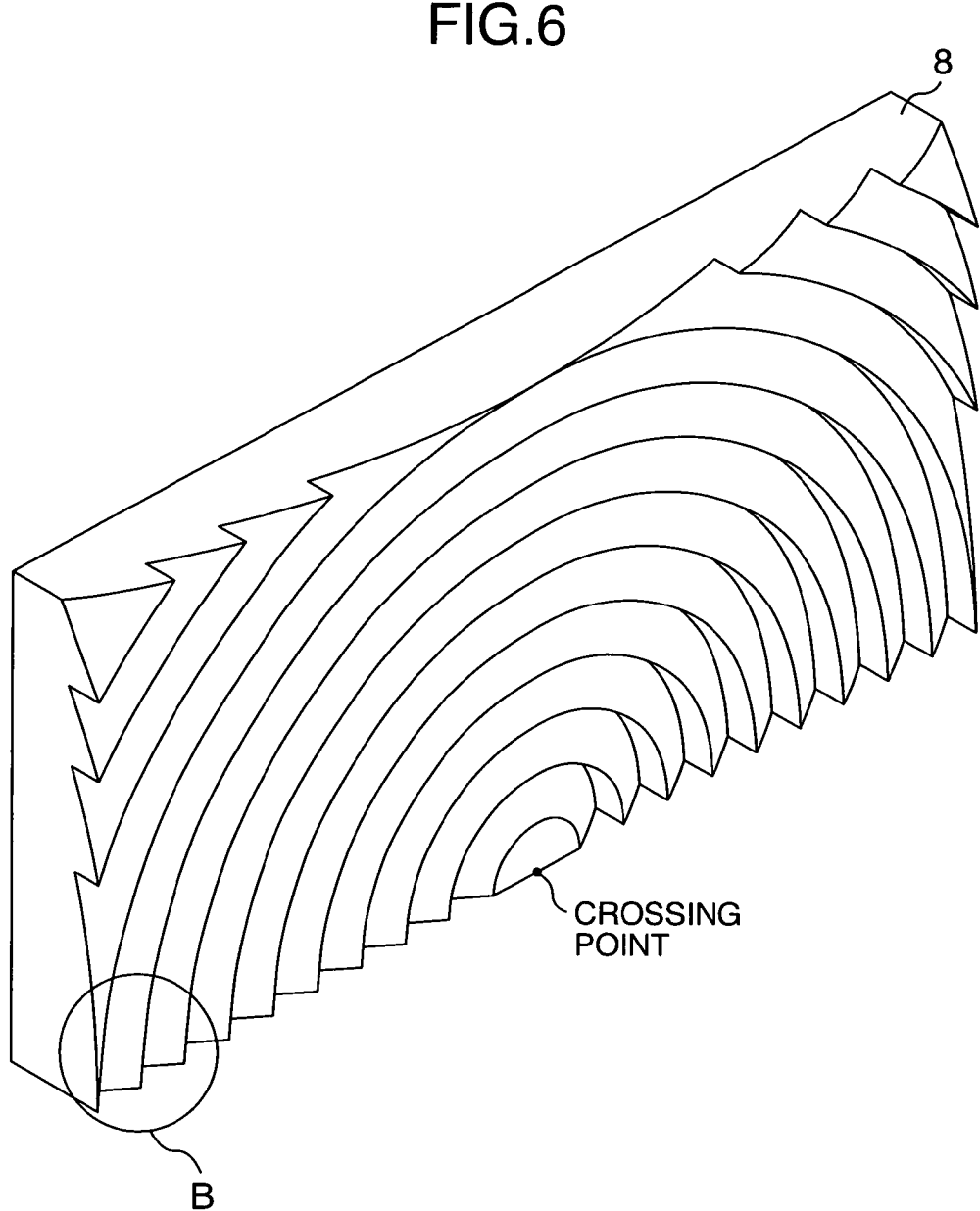
FIG. 6 is an oblique projection view showing a screen including a center of concentric circular prism surfaces.
Figure 11:
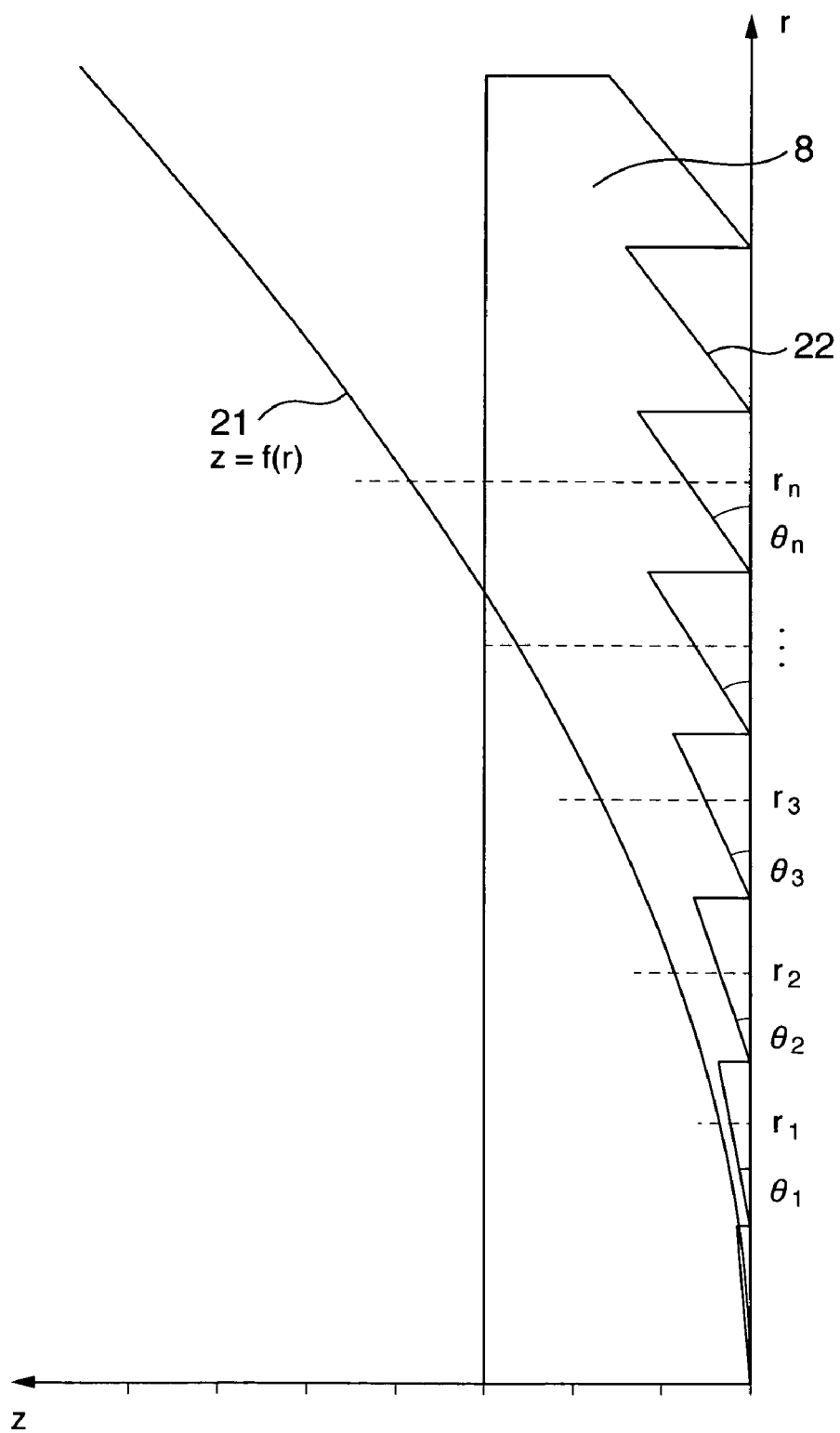
FIG. 11 is a view showing a relationship between the original lens surface and the prism surface of the Fresnel lens.

A relationship between the original surface 21 of the Fresnel lens sheet 8 obtained along the aspherical coefficients in table 4 and the prism surfaces 22 of the Fresnel lens is shown in FIG. 11. FIG. 11 shows a cross section of the Fresnel lens sheet 8 being parallel to the normal line of the Fresnel lens sheet 8 and including the rotational axis. In FIG. 6, r corresponds to r in the formula 3 representing the distance from the rotational axis. The Fresnel angle $\theta_1$ of the prism surface 22 of the Fresnel lens (an angle between the main planer surface of the Fresnel lens sheet 8 and the prism surface) at the distance $r_1$ is substantially equal to an inclination (tangential line) of the original surface 21 at the distance $r_1$. That is, when the aspherical formula of the original surface represented by the formula 3 is Z ($=F(r_n)$) and n is integer number not less than 1, the Fresnel angle $\theta_n$ of each position on the Fresnel lens 8 is represented by the formula 4.

$$\theta_n = F(r_n)'$$ formula 4

Therefore, $\theta_1 = F(r_1)'$, $\theta_2 = F(r_2)'$, $\theta_3 = F(r_3)'$, - - - are obtained. As described above, the Fresnel angled $\theta_n$ at each position on the Fresnel lens sheet 8 substantially corresponds to a differential value on each position (each distance $r_n$) of the aspherical formula so that the Fresnel angle $\theta_n$ at each position on the Fresnel lens sheet 8 is determined. As described above, the light beam proceeding into the Fresnel lens sheet 8 is refracted by the prism surfaces 22 of the Fresnel lens. If the original surface 21 of the Fresnel lens sheet 8 has the aspherical shape determined in accordance with the incidence angles of the light beams proceeding into the respective positions of the Fresnel lens sheet 8, the light beam refracted by each of the prism surfaces 22 is emitted parallel to the normal line of the Fresnel lens sheet.

Accordingly, the angles of the prism surfaces of the Fresnel lens stepwise or gradually increase along a radially outward direction from the center of the Fresnel lens. In the embodiment, the Fresnel angle of the prism surface 22 at the upper portion of the Fresnel lens sheet (that is, the farthest position from the rotational axis) is greater than the Fresnel angle of the prism surface 22 at the lower portion of the Fresnel lens sheet (that is, the closest position from the rotational axis), because the incidence angle of the light beam at the upper portion of the screen is greater than the incidence angle of the light beam at the lower portion of the screen in the oblique projection optical system of the embodiment. Further, in the embodiment, since the rotational axis is arranged at the outside of the Fresnel lens sheet 8, the prism surfaces 22 are inclined in the same direction.

Further, in the embodiment, the optical axis of the projection lens is arranged on the y-z plane so that the axis of the image forming light beam is refracted on the y-z plane by two curved surface reflection mirrors and a planer surface reflection mirror. Incidentally, a total number and arrangement of these optical elements should not be limited to the above embodiment.

For example, the optical axis of the projection lens may be directed parallel to the x coordinate, and the optical axis may be bent in the direction of the z coordinate by the reflection mirror or the curved surface reflection mirror so that the light beam is reflected on the y-z plane by the curved surface reflection mirror and the planer surface reflection mirror. By this arrangement, the projection lens and the image forming source can be contained in the chassis below the screen so that a height of the image display apparatus can be kept low.

Further, the projection optical system of the embodiment may includes at least one curved surface for correcting the trapezoidal deformation and aberration, and the two curved surface reflection mirrors do not need to be used. For example, the curved surface may be formed by at least one reflection free-form surface. Alternatively, a lens having at least one non-reflecting type but a refraction type free-form curved surface, that is, a non-rotationally symmetrical lens having a free-form surface may be used. Further, a combination of the reflection type free-form curved surface (free-form curved surface reflection mirror) and the refraction type free-form curved surface (free-form curved surface lens) may be used as a matter of course. The free-form curved surface lens may be curved to be concaved to emit the light therefrom, and a curvature of an area thereof for emitting the light beam to be received by the lower end of the screen may be greater than a curvature of another area thereof for emitting the light beam to be received by the upper end of the screen.

Incidentally, in the above described embodiment, the prism surfaces are determined to calculate the aspherical surface of the lens for the Fresnel lens 8. However, a difficulty for optimizing it may be caused by, for example, an oblique projection distance or the like. Hereafter, how to determine preferably the prism surfaces in such situation will be explained.

Generally, a horizontal angle of visibility is wider than a vertical angle of visibility. Therefore, a diffusion effect in horizontal direction is improved by the lenticular lens. The vertical angle of visibility is increased by the dispersing members (reference numbers 9, 11 in FIG. 2) in the lenticular lens. Accordingly, the shapes of the prism surfaces of the Fresnel lens are determined as follows. That is, the angles of the prism surface are not calculated to make the light beams emitted from the screen parallel to the normal line of the screen to be optimized, but they are calculated to decrease outgoing angles of vertical components of the light beams emitted from the screen separated from horizontal components thereof to about 0 degree. Accordingly, the prism surface at each screen position is determined.

The vertical component to which the low dispersing effect is applied can be emitted at the outgoing angle of about zero degree by the original surface obtained by combining continuously the prism surfaces determined as described above. Therefore, they can be dispersed sufficiently by the conventional dispersing members. On the other hand, the horizontal component to which the high dispersing effect is applied can be dispersed sufficiently even when the outgoing angle thereof is great. Incidentally, the prism surfaces of the Fresnel lens forming the Fresnel lens sheet 8 may have a curved surface, and does not need to have necessarily the aspherical shape. However, the Fresnel lens 8 having the prism surfaces corresponding to the aspherical shape of the original surface improves further an evenness in brightness of the image over the whole of the screen surface. Incidentally, each of the prism surfaces may be planer or curved in a cross section of the Fresnel lens sheet 8 including the rotational axis. The curved surface may be aspherical.

In the above embodiment, the prism surfaces of the Fresnel lens corresponding to the aspherical shape of the original surface extend concentrically circularly around the rotational axis, and the rotational axis is arranged at the outside of an image display area of the image display apparatus. However, the rotational axis may be arranged at the inside of the image display area of the image display apparatus. On the other hand, if a central point of concentric circles of the prism surfaces is arranged at the inside of the image display area of the image display apparatus, a refractive power is easily adjustable to make the outgoing angle from the screen light emitting surface substantially zero. A reason thereof is described below. Incidentally, hereafter, the adjustment of the refractive power is called as refraction adjustment.

At first, a case where the rotational axis is arranged at the inside of the Fresnel lens sheet is taken into consideration. The prism surfaces on an imaginary horizontal line passing the rotational axis refract the light only in horizontal or left-right direction, and do not refract the light in vertical or up-down direction. Therefore, when the light beam including vertical component reaches the horizontal line passing the rotational axis, the light beam including vertical component cannot be effectively changed to a collimated light beam (parallel to the normal line of the screen main planer surface).

In the embodiment, the projection optical system for projecting the image upwardly and obliquely toward the screen is used, and the oblique projection optical system has the curved surface for restraining the trapezoidal deformation and aberration on the screen. In such optical system, all of the light beams supplied to the screen include usually the vertical components. Therefore, it is preferable for the Fresnel lens sheet 8 to be prevented from including the prism surface unable to refract the light vertically, so that the vertical and horizontal refraction adjustments are enabled to be performed at each positions of the Fresnel lens sheet 8.

In the embodiment as shown in FIG. 3, the center (at which normal lines of at least one of the arc-shaped prism surfaces at respective positions distant from each other along the at least one the arc-shaped prism surfaces cross each other as a crossing point as seen in a thickness direction of the Fresnel lens sheet) of the Fresnel lens is arranged at the outside of the Fresnel lens sheet 8 so that all of the prism surfaces of the Fresnel lens sheet can refract the light in both of the vertical and horizontal directions. Therefore, the refraction adjustment in both of the vertical and horizontal directions can be performed at each position of the Fresnel lens sheet 8. In other words, by arranging the rotational axis at the outside of the Fresnel lens sheet 8, the light beams taken into the screen can be converted effectively to the collimated light beams.

If the center of the Fresnel lens is arranged at the inside of the Fresnel lens 8 in the projection type image display apparatus using the projection optical system including the curved surface reflection mirror, the following problem occurs.

Figure 7:
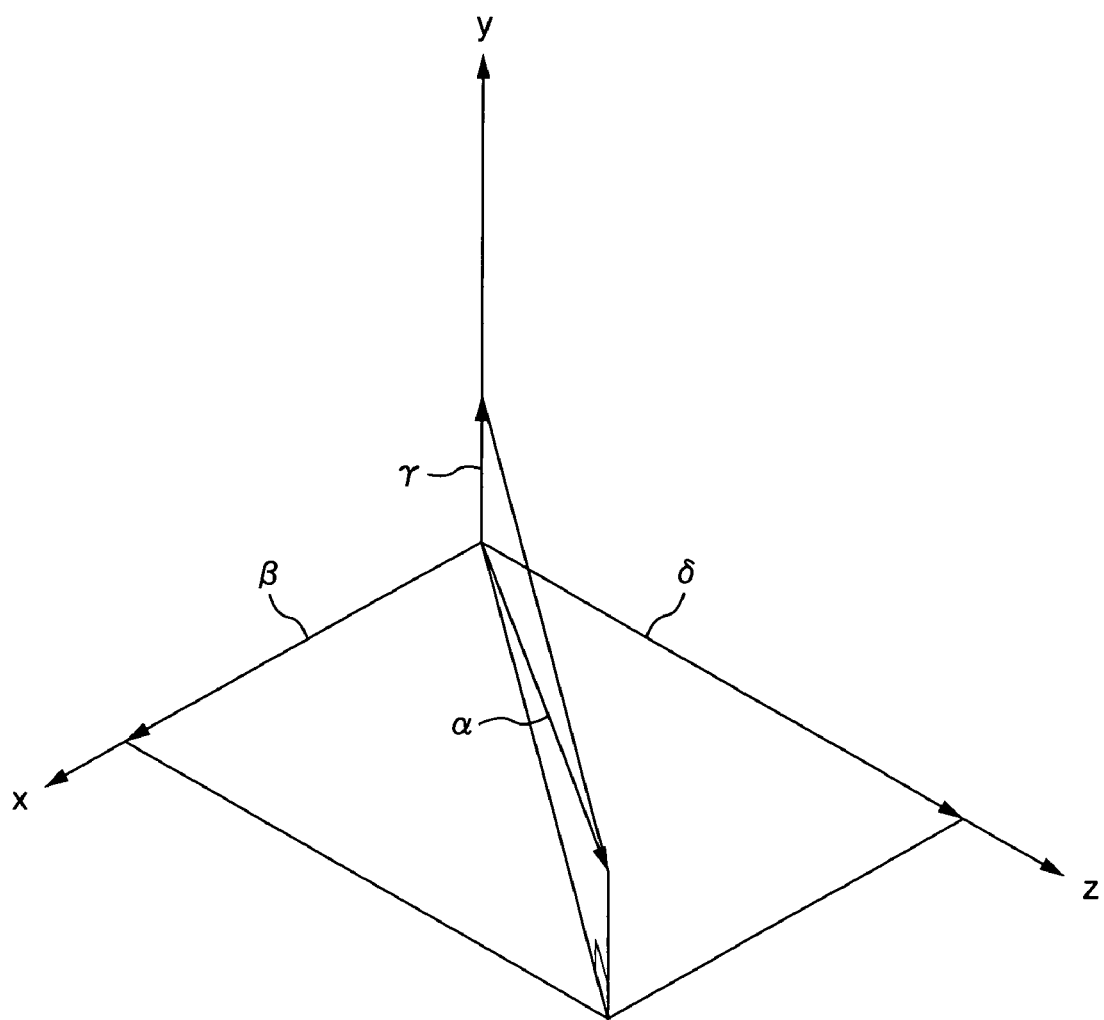
FIG. 7 is a schematic view showing a direction of an incidence light beam α taken into an area B in FIG. 6.

If the center of the Fresnel lens is arranged at the lower end of the Fresnel lens sheet 8 as shown in FIG. 6, the prism surfaces on a horizontal area overlapping the center of the Fresnel lens may be deemed to extend parallel to the vertical direction of the screen. A light beam α proceeding into B portion at a lower left area of the screen in FIG. 6 is shown in FIG. 7. The light beam α can be divided to a component β along x coordinate, a component γ along y coordinate and a component δ along z coordinate. A direction of the component δ corresponds to a direction of the light beam emitting perpendicularly to the Fresnel lens sheet, and the component β along x coordinate, the component γ along y coordinate need to be refracted to be emitted in the direction of the component δ. However, since the prism surfaces of the Fresnel lens sheet 8 have no angle with respect to the y coordinate, the light beam cannot be refracted to be emitted in the direction of the component δ. Therefore, the light beam a proceeding into B portion at the lower left area of the screen is emitted upwardly from the screen rather than perpendicularly to the screen.

The below mentioned embodiment solves the problem occurring when the center of the Fresnel lens is arranged at the inside of the Fresnel lens 8. That is, in the embodiment, incidence prism surfaces 30 are arranged at a part of a light incidence surface of the Fresnel lens sheet 8 including a point opposed to the center of the Fresnel lens. Hereafter, the part on which the incidence prism surfaces 30 are arranged is called as a prism area. The incidence prism surfaces 30 extend straightly and horizontally as seen from the screen surface and juxtaposed with each other vertically, as shown in FIGS. 8, 9 and 10.

Figure 8:
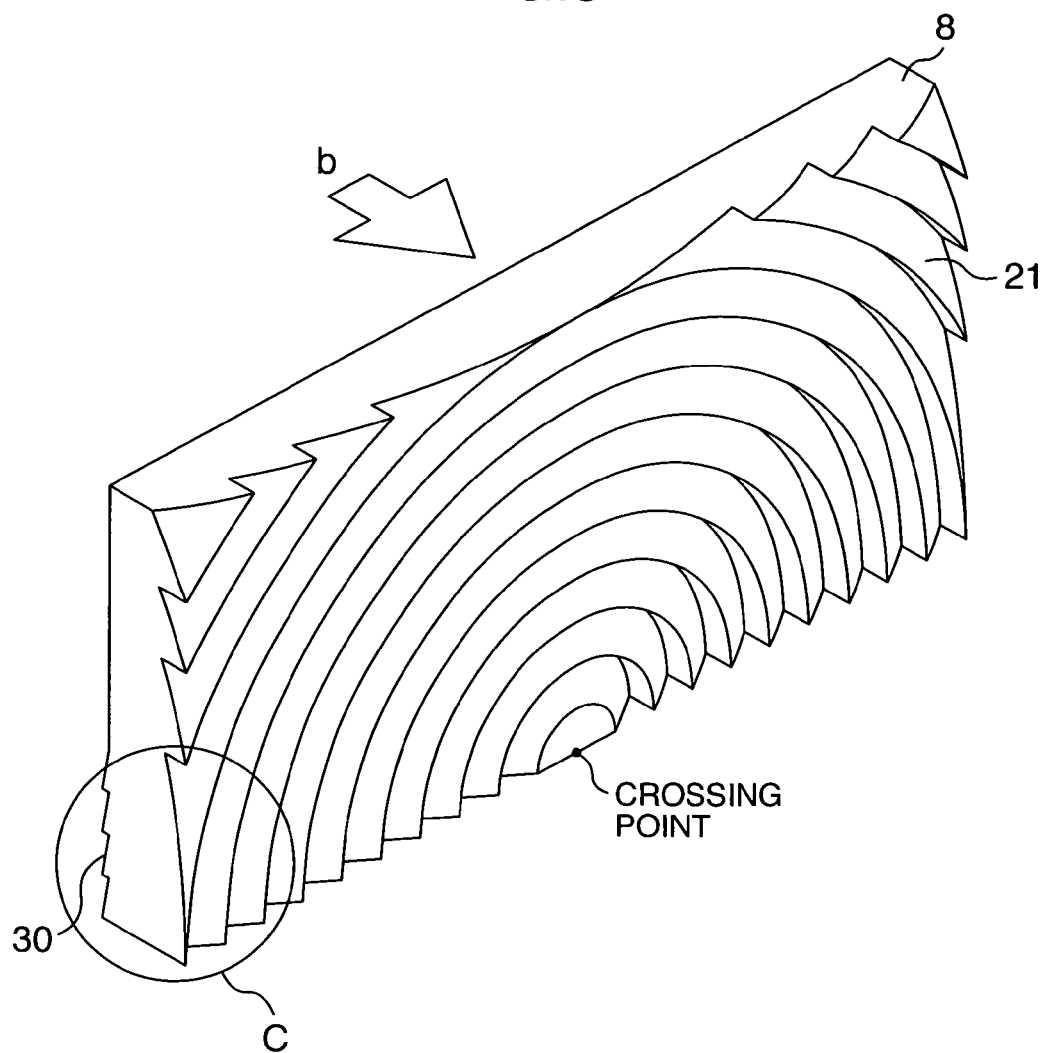
FIG. 8 is an oblique projection view showing an embodiment of a Fresnel lens sheet of the invention as seen from a light beam outgoing side.
Figure 9:
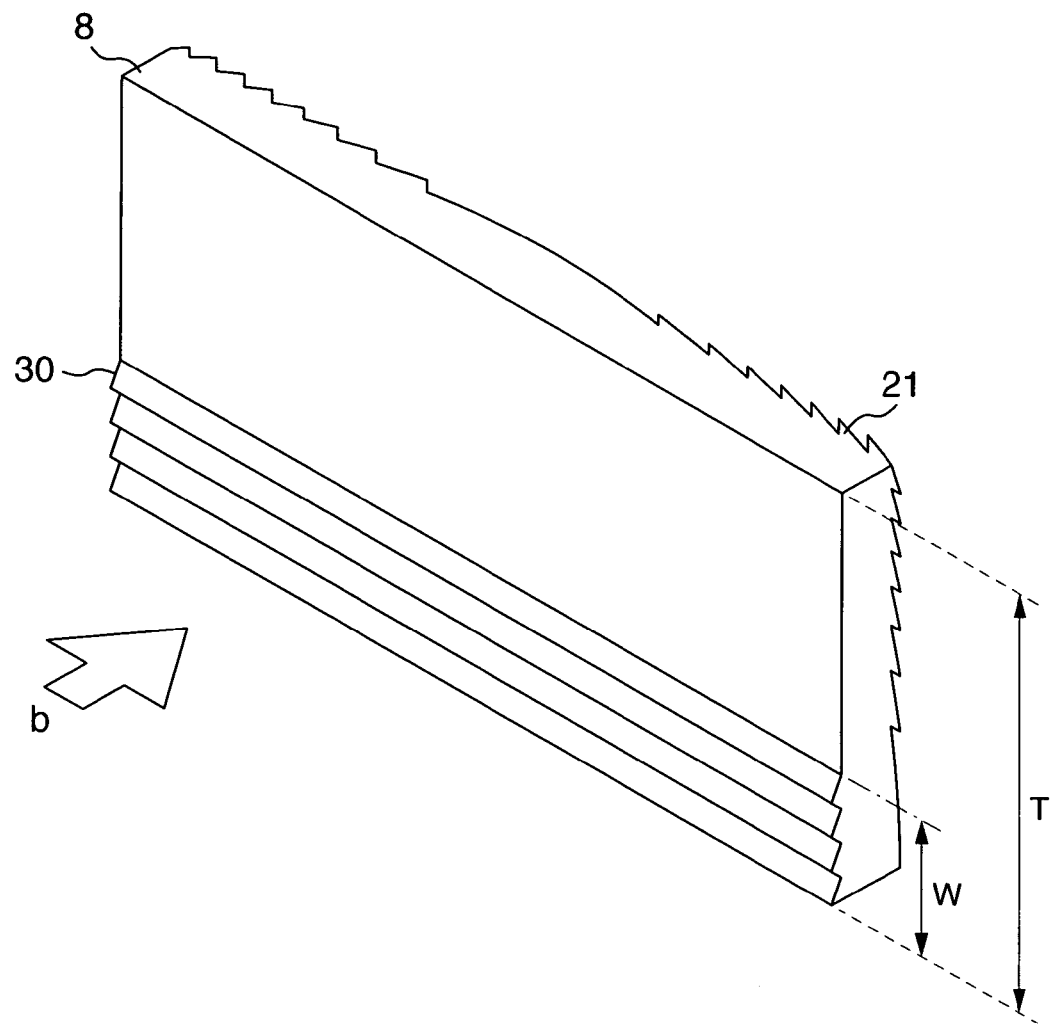
FIG. 9 is an oblique projection view showing the embodiment of the Fresnel lens sheet of the invention as seen from a light beam incidence side.

As shown in FIGS. 8 and 9, the light beam proceeds into the Fresnel lans sheet 8 in b direction. Another part of the light incidence surface of the Fresnel lens sheet 8 other than the prism area is substantially planer, and the Fresnel lens 21 of concentric circular shape for emitting the light beam substantially parallel to the screen surface is arranged on an emitting surface of the Fresnel lens sheet 8. The prism area includes the incidence prism surfaces 30 juxtaposed with each other vertically and extending parallel to a lower side of the Fresnel lens sheet. An optical operation of the incidence prism surfaces 30 is explained below with making reference to FIG. 10.

Figure 10:
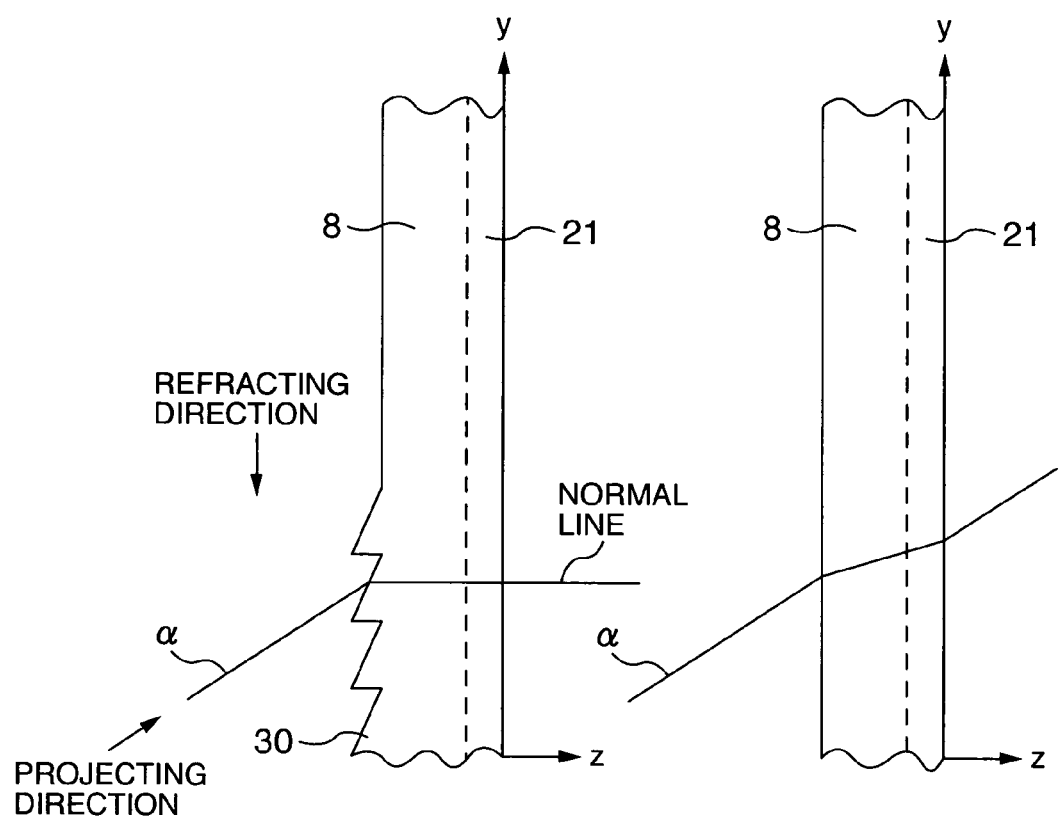
FIG. 10 is a schematic cross sectional view showing region C of the embodiment of the Fresnel lens sheet of the invention in y-z coordinates.

As shown in a left portion of FIG. 10, the incidence prism surfaces 30 refract the light beam in y-z face to be emitted parallel to the normal line of the screen surface so that the vertical component of the outgoing light beam emitted from the Fresnel lens sheet 8 is made substantially zero. Angles of the incidence prism surfaces, that is, vertically refracting value are determined from an average of desired vertically refracting values for the light beams proceeding into the prism area. On the other hand, as shown in a right portion of FIG. 10, the outgoing light beam emitted from the Fresnel lens sheet 8 is directed vertically upward, because the incidence prism surfaces 30 do not vertically refract the light beam proceeding into the planer another part of the light incidence surface.

As described above, in the embodiment, the incidence prism surfaces 30 are arranged only on the prism area rather than the whole of the light incidence surface of the Fresnel lens sheet 8. The prism area has a predetermined width W in the vertical direction of the screen as shown in FIG. 9. The width W is determined to satisfy a formula of $T/15 \leqq W \leqq T/4$ when a vertical dimension of the screen is T. For example, when a size of the screen is 50 inches and the vertical dimension thereof T is about 600 mm, the width W is about 40-150 mm. That is, the area of the width W has a small vertical refractive power, and whereby the incidence prism surfaces 30 are arranged on such area to refract the light beam vertically as a substitute for the Fresnel lens in the vicinity of the center of the Fresnel lens. Accordingly, the outgoing light beams of the outgoing angle of substantially zero can be emitted from such area of the small vertical refractive power.

Figure 12:
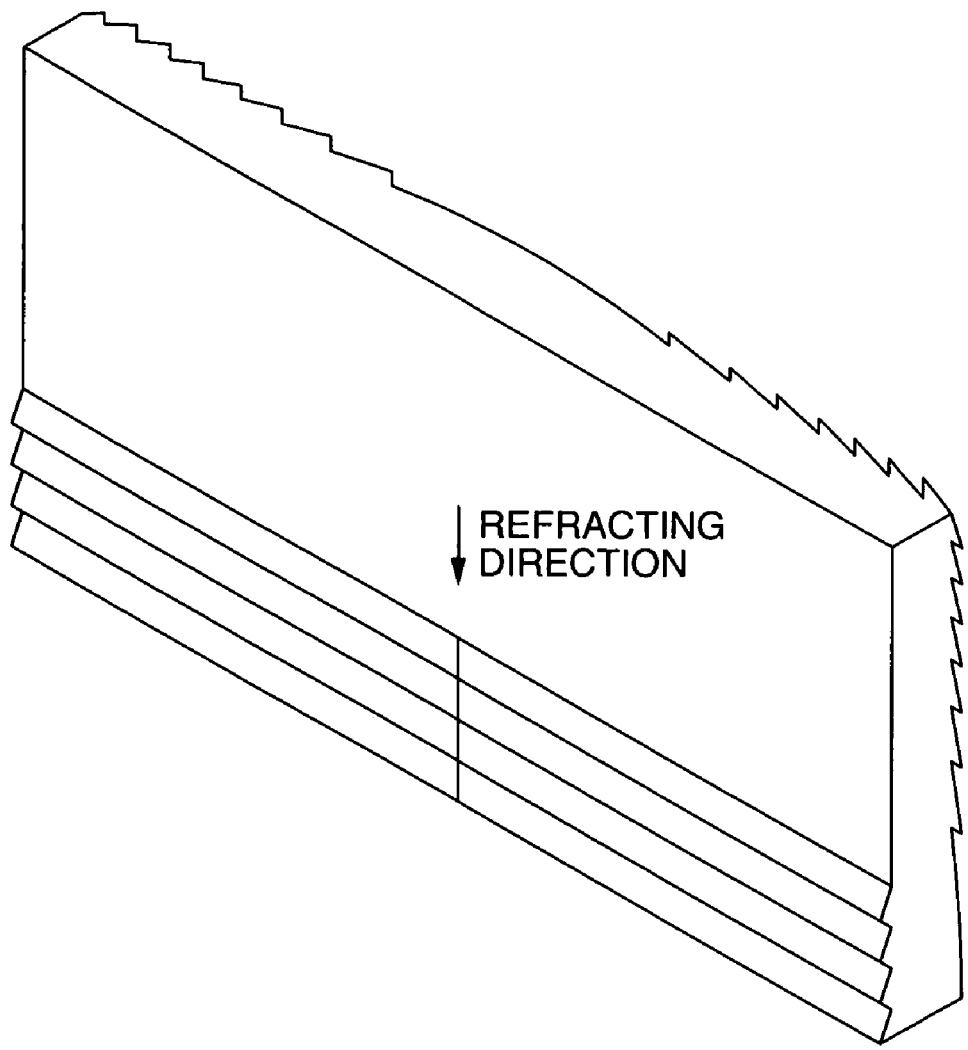
FIG. 12 is an oblique projection view showing another embodiment of a Fresnel lens sheet of the invention in which a height of the prism surface on a reverse surface gradually decreases radially inward.
Figure 13:
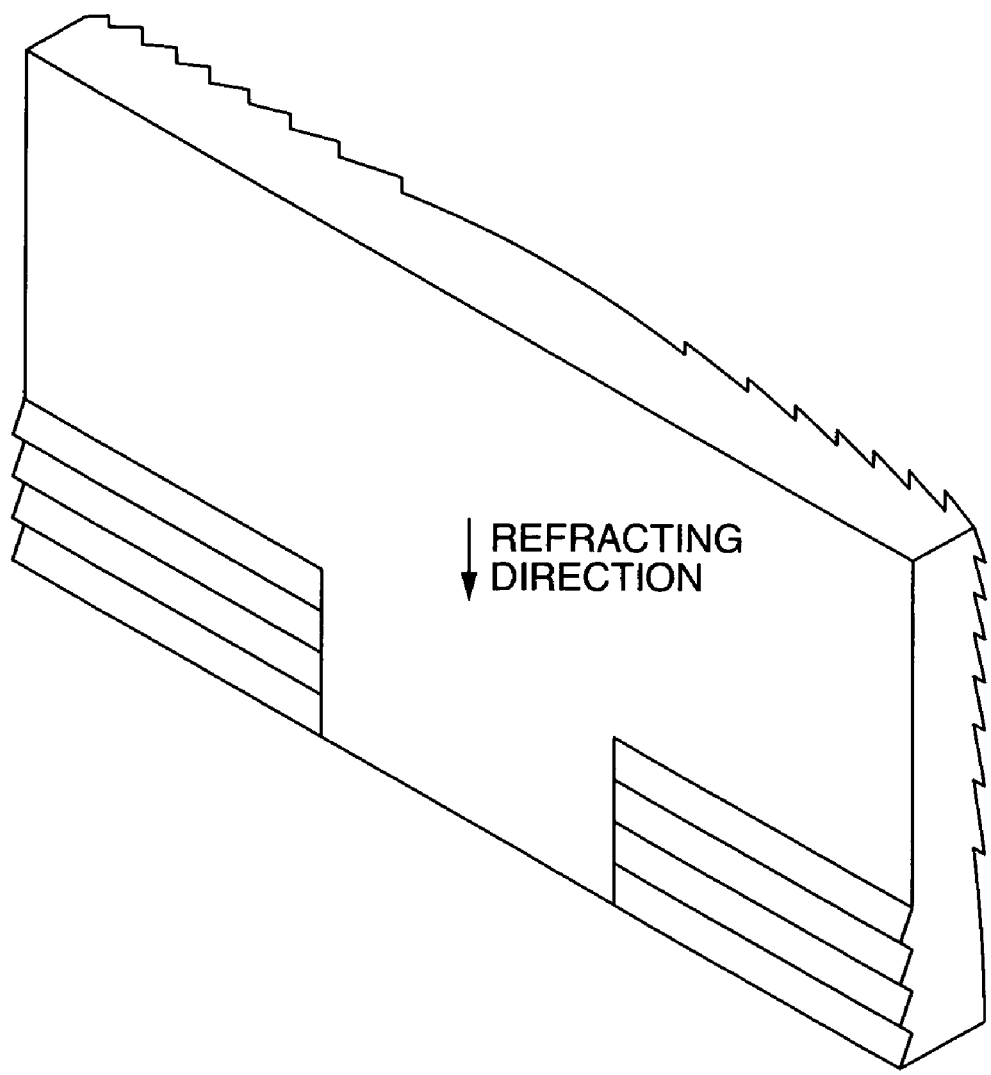
FIG. 13 is an oblique projection view showing another embodiment of a Fresnel lens sheet of the invention in which the prism surface on a reverse surface is prevented from being formed on a central area in a direction perpendicular to a refracting direction by the prism surface on a reverse surface.

In the embodiment, the incidence prism surfaces 30 are arranged on the whole horizontal length of the screen. However, the incidence prism surfaces 30 do not need to be arranged on the whole horizontal length of the screen. A part of the Fresnel lens in the vicinity of the center of the Fresnel lens has the vertical refractive power, and the vertical refractive power decreases radially outwardly from the center of the Fresnel lens. Therefore, a height or prism-angle of the incidence prism surfaces 30 at a radially inner side in the vicinity of the center of the Fresnel lens may be smaller than that at a radially outer side of the Fresnel lens as shown in FIG. 12. Alternatively, the incidence prism surfaces 30 may be prevented from being arranged at the radially inner side in the vicinity of the center of the Fresnel lens as shown in FIG. 13.

Further, since the incidence prism surfaces 30 and the prism surfaces of the Fresnel lens are perpendicular to each other, moiré therebetween does not need to be considered. Therefore, a pitch of the incidence prism surfaces 30 is determined in accordance with a pitch of pixels or the like.

Although the center of the Fresnel lens is arranged at the lower end of the Fresnel lens sheet in the above embodiment, the center of the Fresnel lens of the Fresnel lens sheet 8 may be arranged within the screen surface while the incidence prism surfaces 30 are arranged on the area including the point opposed to the vicinity of the center of the Fresnel lens so that the same effect is obtained. Although the light beam proceeding into the area including the point opposed to the vicinity of the center of the Fresnel lens has a vertically upward component in the above embodiment, the light beam proceeding into the area including the point opposed to the vicinity of the center of the Fresnel lens may have a vertically downward component when the inclination of the incidence prism surfaces 30 is inversed with respect to that of incidence prism surfaces 30 shown in FIGS. 8-10.

Figure 4:
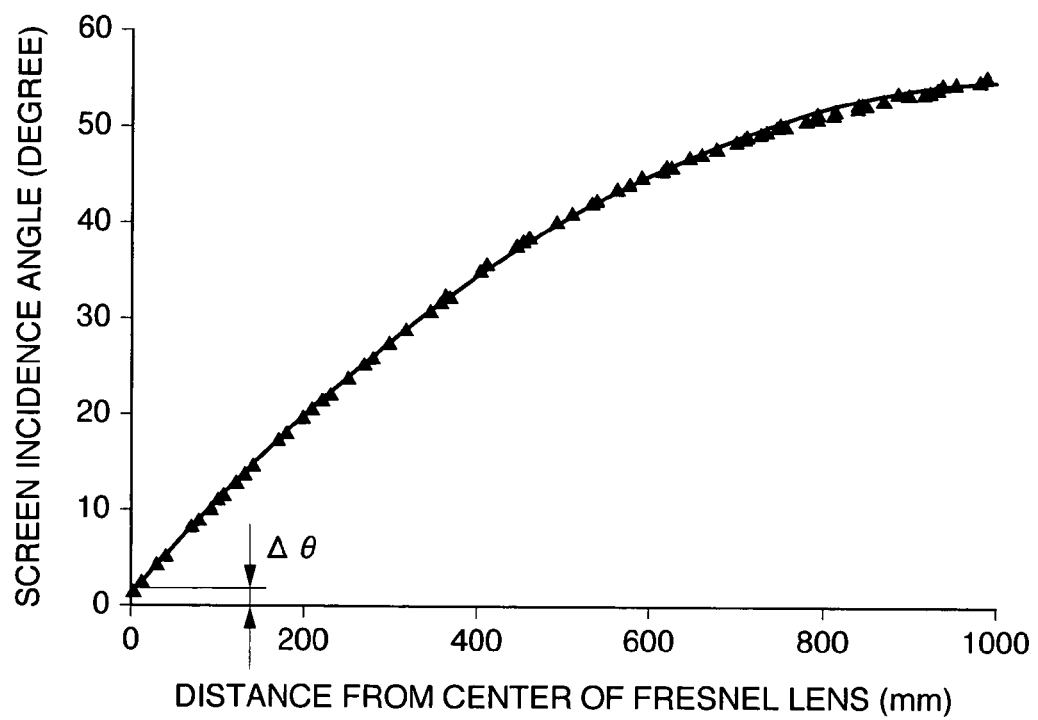
FIG. 4 is a diagram showing a relationship between a distance of a position from a center of the Fresnel lens and a light incidence angle at the position.

From FIG. 4 showing a distribution of the incidence angle of the light beam proceeding into the screen (ordinate) with respect to a distance from the center of the Fresnel lens (abscissa) as actually measured in the magnifying projection system as described above, it is known that the incidence angle is not zero but is $\Delta\theta$ at the center of the Fresnel lens.

Figure 5:
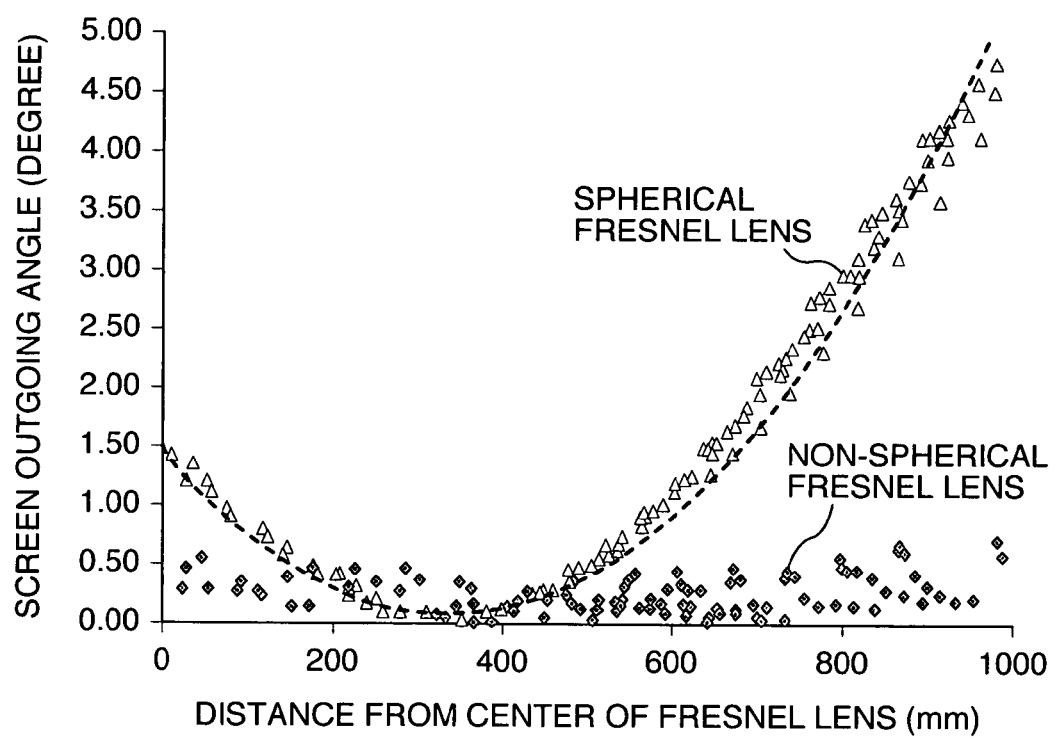
FIG. 5 is a diagram showing a relationship between the distance of the position from the center of the Fresnel lens and a light outgoing angle at the position.

In FIG. 5 showing a distribution of the outgoing angle of the light beam emitted from the screen (angle between the outgoing light beam and the normal line of the screen surface) with respect to the distance from the center of the Fresnel lens (abscissa), the outgoing angle of the light beam emitted from the screen obtained when the Fresnel lens sheet 8 having the Fresnel lens corresponding to a spherical shape as the original surface is shown by a dot line.

As shown in FIG. 5, a difference in the outgoing angle between the Fresnel lens corresponding to the spherical shape as the original surface and the Fresnel lens corresponding to the aspherical shape as the original surface is about 5 degrees as maximum value in accordance with the distance from the center of the Fresnel lens (abscissa). Further, the difference is about 1.5 degree in the vicinity of the center of the Fresnel lens at which the refraction is not obtained in y and z directions. Therefore, the brightness over the screen is inconstant. On the other hand, when the Fresnel lens sheet 8 as the embodiment is used, since the Fresnel lens corresponds to the aspherical shape of the original surface and the incidence light beam is refracted vertically by the incidence prism surfaces 30, the outgoing angle of the light emitted from the screen surface is limited to not more than about 0.8 degree irrespective of the distance from the center of the Fresnel lens (abscissa). In other words, the brightness over the screen is constant over the whole of the screen surface.

The image display apparatus of screen diagonal size of 50 inches (aspect ratio 9:16) with the magnifying projection optical system as described above has a depth of about 300 mm so that a decrease in depth is further developed. Incidentally, the projection lens of the above embodiment has a projection length of 1300 mm to magnify and project the image onto the screen of diagonal size of 50 inches (aspect ratio 9:16). However, the invention is not limited to the above embodiments regarding dimensions and characteristics of the elements thereof. For example, the dimensions and characteristics may be modified with the curved surface reflection mirror in accordance with the oblique projection angle and the projection length.

As described above, the invention is applicable to the image display apparatus in which the oblique projection optical system is used to decrease the depth and the curved surface reflection mirror is used to correct the trapezoidal deformation and aberration caused by the oblique projection. For emitting the light beams perpendicular to the screen surface after receiving the light beams having respective incidence angles different from each other, the original surface corresponding to the Fresnel lens of the Fresnel lens sheet is aspherical in the embodiments. Further, the incidence prism surfaces 30 are arranged at the area including the point opposed to the center of the Fresnel lens. Therefore, the light beams emitted from the whole of the screen surface are made perpendicular to the normal lines of the screen surface so that a high quality image with constant brightness is obtainable. Additionally, the depth of the apparatus is decreased.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A projection type image display apparatus comprising an image forming source for forming an image, a screen and a projection optical device for magnifying the image formed by the image forming source and projecting it obliquely to have a predetermined angle with respect to a normal line of the screen, wherein the screen has at least a Fresnel lens sheet including a plurality of Fresnel lenses concentrically arranged on a light emitting side of the Fresnel lens sheet, prism angles of the Fresnel lenses increase in a direction radially outward from a center of the concentric Fresnel lenses, and the Fresnel lens sheet includes a plurality of incidence face prisms extending horizontally and juxtaposed vertically on a predetermined area of a light incidence surface of the Fresnel lens sheet, which area includes a position opposite to the center of the Fresnel lenses, wherein a vertical width of the predetermined area including the incidence face prisms is T/15-T/4, where T is a vertical width of the screen.

2. The projection type image display apparatus according to claim 1, wherein an original surface formed by continuously joining prism surfaces of the Fresnel lenses is aspherical.

3. The projection type image display apparatus according to claim 1, wherein the screen further has a dispersing sheet arranged on the light emitting side of the Fresnel lens sheet to disperse at least horizontally the light emitted from the Fresnel lens sheet.

4. A projection type image display apparatus comprising an image forming source for forming an image, a screen and a projection optical device for magnifying the image formed by the image forming source and projecting it obliquely to have a predetermined angle with respect to a normal line of the screen,
   wherein the screen has at least a Fresnel lens sheet including a plurality of Fresnel lenses concentrically arranged on a light emitting side of the Fresnel lens sheet,
   an original surface formed by continuously joining prism surfaces of the Fresnel lenses is aspherical, and
   the Fresnel lens sheet includes a plurality of incidence face prisms extending horizontally and juxtaposed vertically on a predetermined area of a light incidence surface of the Fresnel lens sheet, which area includes a position opposite to the center of the Fresnel lenses,
   wherein a vertical width of the predetermined area is T/15-T/4, where T is a vertical width of the screen.

5. The projection type image display apparatus according to claim 4, wherein the projection optical device has a curved surface mirror to reflect the magnified image onto the screen, and aspherical coefficients defining the aspherical shape of the original surface are determined so that the projected image proceeding into the incidence surface of the Fresnel lens sheet after being reflected by the curved surface mirror is deflected to be emitted from the substantial whole of the screen with outgoing angles of substantial zero.

6. A screen usable for a projection type image display apparatus, comprising at least
   a Fresnel lens sheet including a plurality of concentric Fresnel lenses on a light emitting surface thereof, and
   a dispersing sheet arranged at a light emitting side of the Fresnel lens sheet to disperse at least horizontally the light emitted from the Fresnel lens sheet,
   wherein prism angles of the Fresnel lenses increase in a direction radially outward from a center of the concentric Fresnel lenses, and
   the Fresnel lens sheet includes a plurality of incidence face prisms extending horizontally and juxtaposed vertically on a predetermined area of a light incidence surface of the Fresnel lens sheet, which area includes a position opposite to the center of the Fresnel lenses,
   wherein a vertical width of the predetermined area including the incidence face prisms is T/15-T/4, where T is a vertical width of the screen.

7. The screen according to claim 6, wherein a light flux from a center of an image forming source for forming an image proceeds into an incidence surface of the Fresnel lens sheet obliquely to a normal line of the incidence surface.

8. The screen according to claim 6, wherein an original surface formed by continuously joining prism surfaces of the Fresnel lenses is aspherical.

9. The screen according to claim 6, wherein a prism height of the incidence face prisms at a central portion of the screen is lower than a prism height of the incidence face prisms at another portion thereof other than the central portion.

10. The screen according to claim 6, wherein the incidence face prisms is prevented from being arranged at a central portion of the screen on the predetermined vertical area.

11. The screen according to claim 6, wherein the center of the Fresnel lenses is arranged in the vicinity of a lower end of the screen, and the incidence face prisms extend substantially parallel to an edge of the lower end of the screen.

12. The screen according to claim 6, wherein the dispersing sheet including a plurality of lenticular lenses juxtaposed horizontally and one of micro-beads and a total internal reflection surface for reflecting at least horizontally the light emitted from the Fresnel lens sheet to be dispersed.

13. A Fresnel lens sheet usable for a screen in a projection type image display apparatus, comprising,
   Fresnel lenses concentrically arranged on a light emitting surface of the Fresnel lens, and
   a plurality of incidence face prisms arranged on a predetermined area of a light incidence surface of the Fresnel lens sheet, which area includes a position opposite to a center of the Fresnel lenses,
   wherein the incidence face prisms extend horizontally and are juxtaposed vertically on the predetermined area, and
   prism angles of the Fresnel lenses increase in a direction radially outward from the center of the concentric Fresnel lenses,
   wherein a vertical width of the predetermined area is T/15-T/4, where T is a vertical width of the screen.

14. The Fresnel lens sheet according to claim 13, wherein an original surface formed by continuously joining prism surfaces of the Fresnel lenses is aspherical.

* * * * *